3,502,747
POLYMERIC COMPOSITIONS

Erhardt Fischer and Eric G. Kent., Sarnia, Ontario, Canada, assignors to Polymer Corporation Limited, Sarnia, Ontario, Canada, a body corporate and politic
No Drawing. Original application Apr. 22, 1966, Ser. No. 544,383. Divided and this application Apr. 3, 1968, Ser. No. 738,738
Claims priority, application Canada, May 15, 1965, 930,767
Int. Cl. C08f 29/12
U.S. Cl. 260—894                        10 Claims

ABSTRACT OF THE DISCLOSURE

The rate of hardening of a synthetic trans-1,4 polymer of isoprene is increased by incorporating therein not more than 0.7 part by weight per 100 parts by weight of isoprene polymer, of a high crystalline synthetic resin such as high trans-1,4 polybutadiene or a crystalline copolymer of butadiene with a small amount of piperylene.

---

This application is a division of our copending application Ser. No. 544,383 filed on Apr 22, 1966, which is a continuation-in-part of copending application Ser. No. 497,451 filed Oct. 18, 1965.

This invention relates to polymeric compositions and particularly to compositions based on synthetic crystalline, trans-1,4 polymer of isoprene.

Natural trans-1,4 polymer in the form of either balata or gutta percha, has found considerable application in the manufacture of, for example, golf ball covers, belting, adhesives and submarine cables. However, the existence of a high demand for natural trans-1,4 polymer, especially for golf balls, has tended to outstrip the quantity of this material available to the market.

Synthetic trans-1,4 polymers of conjugated diolefins, for example trans-1,4 polyisoprene, have recently been developed, in order that these materials might bridge the gap between supply and demand of the natural material. However, it is very difficult to control the process closely for manufacture of such synthetic polymers to obtain polymers having properties sufficiently similar to the natural material to allow their use as substitutes therefor.

More specifically, one of the properties of naturally-occurring balata or gutta percha which it is desired that any synthetic substitute should match, is its rate of hardening. In many of the practical applications of these materials, the property of hardness of the material is of importance. The materials themselves are thermoplastic rubbers, being soft and rubbery at temperatures above their softening point, but hard and leathery below their softening point. In making an article from a trans-1,4 polymer of isoprene, it is usual to heat the polymer to a temperature above its softening point, mould it into the required shape and then allow the polymer to cool below the softening point, so that it assumes its hard condition in the desired shape. It is thus of importance to the economic considerations of a process for making articles from these polymers that its rate of hardening should be high. In the manufacture of golf balls, for example, a low rate of hardening entails increasing the normal time expended on moulding the covers, or running the risk of the covers sticking to the surface of the mould on attempting to remove them prematurely. This desirable property of a high rate of hardening is possessed by the naturally-occurring material, but not in all cases by the synthetic polymers. It is a property which it is extremely difficult to ensure that the polymer will possess by regulation of the manufacturing process.

It is an object of this invention to improve the hardening rate property of a synthetic, crystalline, trans-1,4 polyisoprene.

The object of this invention may be achieved by one of two precesses.

According to the first process, the hardening rate of a synthetic trans-1,4 polymer of isoprene is improved by dispersing in 100 parts by weight of the polymer not more than 0.7 part by weight of high crystalline synthetic resin such as high trans-1,4 content polybutadiene, a suitable butadiene-piperylene copolymer, or isotactic polypropylene.

According to the second process, the hardening rate of a synthetic trans-1,4 polymer of isoprene is improved by dispersing therein a minor proportion of a natural crystalline resin having a softening point above that of the trans-1,4 polymer of isoprene.

The synthetic polymer of isoprene which can be used in accordance with either process of the present invention is a high molecular weight polymer of isoprene having at least 85 percent of isoprene units in the trans-1,4 configuration. The term "polymer" is understood to include both homopolymer and copolymer with a minor amount of a copolymerizable monomer such as butadien, piperylene, styrene, ethylene or propylene. The copolymerizable monomer is present in an amount of less than 20 mole percent and preferably less than 5 mole percent of the sum of the copolymerized monomer units. The polymer of isoprene contains at least 85 percent and preferably at least 90 percent of the isoprene units in the trans-1,4 configuration, while the remainder is in the 3,4-, 1,2-, and cis-1,4-configurations.

Associated with the high content of trans-1,4 units is a high degree of crystallinity of the trans-1,4 polymer. The degree of crystallinity as referred to herein with reference to polymers is determined by an X-ray diffraction method. In the method, a diffraction curve, a plot of intensity of X-rays scattered against angle of diffraction, is obtained. This cure shows peaks due to crystalline and amorphous parts of the specimen being measured. The ratio of the area under the crystalline peaks to the sum of the areas under the crystalline and amorphous peaks is taken as a measure of the degree of crystallinity of the specimen at the temperature of measurement.

For high trans-1,4 content polyisoprene, the degree of crystallinity may vary within fairly wide limits, from about 15 to about 40 percent. The preferred polymers of isoprene for use in this invention have a degree of crystallinity between 25 and 35 percent. Natural balata has a degree of crystallinity in the region of 30 percent as measured by this method. The hardness of the polymer is associated with its degree of crystallinity.

As previously mentioned, the trans-1,4 polymer of isoprene is a thermoplastic rubber, having a softening point at temperature above which it is soft and rubbery, plastic or elastic, and at temperature below which, for example at room temperature, it is hard and leathery. The transition from the soft to the hard state taking place when the polymer is cooled at a temperature below e.g. 60° C., proceeds at a rate which depends on many factors such as the trans-1,4 content, molecular weight and the type and amount of impurities present. All the factors involved, and the effect and degree of importance of any one particular factor is not fully understood. The rate of hardening of the synthetic polymer or the time which is required for the polymer to regain its original hardness at room temperature thus cannot readily be controlled during manufacture of the polymer. This time may vary from sample to sample from less than two minutes to several hours. This invention is used to good advantage with polymers of isoprene having a hardening time of about 5 to 120 minutes and is especially advantageous with polymers which harden within about 10 to 60 minutes. The trans-1,4 polymers of isoprene used in this invention are known in the art. They may be produced by polymerizing isoprene in the presence of a stereospecific catalyst such as a mixture of trialkyl aluminum and titanium or vanadium trichloride.

Referring now exclusively to the first process of the invention, either high trans-1,4 content polybutadiene or a crystalline copolymer of butadiene and a small amount of copolymerizable monomer such as piperylene may be used as the crystalline resin in the process. Alternatively, synthetic resins such as isotactic polypropylene or trans-1,4 polypiperylene may be used.

When trans-1,4 polybutadiene is used in the first process, the invention is characterized by the use of very small amounts of trans-1,4 polybutadiene, less than 0.7 part by weight per 100 parts by weight of trans polyisoprene, and for best results less than 0.5 part by weight. In fact, it has most surprisingly been found that amounts as little as 0.03, or even less, parts by weight of trans-1,4 polybutadiene per 100 parts by weight of trans-1,4 polyisoprene are very effective in this first process of the invention.

The use of as small an amount as possible of trans-1,4 polybutadiene in trans-1,4 polyisoprene is most desirable, not only from considerations of economy, but also as it is known that the presence of substantial amounts is detrimental to the trans polyisoprene and articles made therefrom. Amounts in excess of those proposed herein of trans-1,4 polybutadiene have a deleterious affect on certain of the physical and dynamic properties of the trans-1,4 polyisoprene, on which the latter depends to a greater or lesser extent for its utility in certain applications. Thus by using the very small amounts, one can achieve the object of increasing the hardening rate of the trans polyisoprene without sacrificing any of the other desirable properties of this polymer.

To enable its use in the first process of the invention, in the small quantities specified, the trans-1,4 polybutadiene should have a trans-1,4 content of at least 98.0 percent. It is also desired that it should have a degree of crystallinity measured by the method previously described of at least 50 percent, an intrinsic viscosity of between 0.5 and 4.0, preferably between 1.0 and 2.5, and a softening point of at least 80° C., and preferably of between 110° C. and 150° C. It should also have a fast rate of crystallizing.

The copolymer of butadiene and piperylene should have a piperylene content of less than 15 mole percent, preferably between 8 and 12 mole percent. It should also have a crystallinity of between 35 and 50 percent as measured by the method previously described, a softening point of at least 70° C. and a trans content of at least 90 percent, preferably at least 93 percent. It may be used in amounts of up to 0.7 part by weight per 100 parts by weight of trans-1,4 polyisoprene, with the preferred range being between 0.1 and 0.5 part by weight.

The trans-1,4 polybutadiene and the copolymer of butadiene and piperylene which are used in this invention can be prepared by polymerizing butadiene monomer or a mixture of butadiene with a minor amount of piperylene in the presence of a stereospecific catalyst. The catalyst may be a mixture of vanadium tetrachloride, titanium tetrachloride and an alkyl lithium as described in U.S. Patent 3,347,839, or a mixture of vanadium trichloride and a trialkyl aluminum.

Suitable isotactic polypropylene is preferably used in amounts of from about 0.2 to about 0.6 part by weight per 100 parts of trans-1,4 polyisoprene.

Referring now exclusively to the second process of the invention suitable natural crystalline resins are those which have a softening point above the softening point of the isoprene polymer, in the region of about 70° C. to 250° C. Such resins may be used in amounts of from about 0.1 to 20 parts by weight per 100 parts by weight of polymer. The preferred range is from about 0.1 part to about 5 parts. A representative example is natural alban resin. This resin is a perpenoid substance occurring in crude balata or gutta percha.

It is extracted from crude natural rubber by an organic solvent such as heptane, octane, aliphatic alcohols or mixtures thereof and when isolated, exists in the form of small needle-like or plate-like crystals. Depending on the extraction medium alban resin has a softening point of about 70° C. to about 230° C. It is preferred to use a resin which is purified by re-crystallization and, therefore, more crystalline and having a softening point in the order of 100° C. or higher. Natural crystalline resins are those which show evidence of crystalline structure when examined by X-ray diffraction methods.

A further example of a suitable natural material is shellac. This crystalline resin is extracted from the secretions deposited upon trees by the insect *Laccifer lacca*, by washing and melting the resin to separate impurities therefrom, and then by re-hardening the resin. Sometimes the resin is subsequently bleached. The shellac most useful in the present invention has a softening point above 100° C.

The softening points of the polymeric materials and resins referred to herein are measured using a Fisher-Johns apparatus. According to this procedure, a small sample of the polymer or resin is placed between two very thin glass discs. This assembly is then placed on a hot plate, and gradually heated. The temperature at which the glass discs can be pressed into contact with each other is recorded at the softening temperature of the polymer.

The incorporation may be accomplished by any suitable means. One method, suitable for both processes of the invention, is to disperse the crystalline resin in the polymer of isoprene on an open two-roll mill or internal Banbury-type mixer. Another method, suitable for both processes is to blend a solution in a suitable solvent of the crystalline resin with a solution of the trans-1,4 polymer of isoprene and then to isolate from the solution blend the polymeric composition of this invention. In the first process where a synthetic resin such as trans-1,4 polybutadiene is used, it may be added to a solution of trans-1,4 polyisoprene, as a solution in the solvent medium in which it is produced, thus obviating the need to recover the resin from its reaction medium. A further method of incorporation, which is especially advantageous in the second process where very small amounts of trans-1,4 polybutadiene are added, is to prepare a mixture of known proportions of the resin and part of the trans-1,4 polyisoprene in solution. The blend can then be recovered from the solution, dried, and dispersed in the remainder of the trans-1,4 polyisoprene. Such a blend permits of easier handling in the solid state than does trans-1,4 polybutadiene, and allows smaller quantities of the resin to be added to the polymer accordingly.

The polymeric composition produced by either process of this invention is characterized by an improved hardening rate, when compared to the trans-1,4 polymer of isoprene alone. The addition of the crystalline resin significantly reduces the time in which the softened polymer recovers its original hardness, that is, the hardness of the polymer conditioned at room temperature for about 24 hours.

The hardening rate of trans-1,4 polymer is determined using a Wallace micro hardness made by H. W. Wallace & Co., Ltd., of Croydon, England. A sample of polymer is conditioned for ten minutes at 100° C., then cooled at 20° C. for fifteen minutes during which time the sample gradually hardens and this hardness is measured at about two minute intervals.

The two processes of the invention are further described and illustrated in the following examples, of which Examples I, II, III, IV and V are relevant to the first process and Examples VI and VII are relevant to the second process.

EXAMPLE I

A dispersion of trans-1,4 polybutadiene resin in trans-1,4 polyisoprene was prepared using a two-roll rubber mill maintained at 150° C. The dispersion contained 0.25 part by weight of trans-1,4 polybutadiene, per 100 parts of the polyisoprene.

The trans-1,4 polybutadiene resin which was used in this example, was prepared by polymerizing butadiene-1,3 in a hydrocarbon medium in the presence of a stereospecific catalyst consisting of a mixture of ethyl aluminum dichloride and diethyl aluminum monochloride and a complex of VCl₃ and ethanol. The polymer was 100 percent soluble in toluene, had an intrinsic viscosity of 1.66 dl./g. measured in toluene at 30° C., crystallinity of 60 percent, trans-1,4 content of 99 percent and a softening point of 140° C.

The trans-1,4 polyisoprene in which the trans-1,4 polybutadiene was dispersed had a crystallinity of 28 percent and a trans-1,4 content of 95 percent.

The trans-1,4 polyisoprene free of the polybutadiene was used as a control. The hardening rate of the dispersion and control was measured on circular buttons, 10 mm. x 0.6 mm., using the Wallace hardness tester. The buttons were moulded at 120° C. The results are shown in Table I.

TABLE I

|  | Wallace Hardness | | | | |
|---|---|---|---|---|---|
|  | Original | Minutes of Cooling | | | |
|  |  | 2 | 3 | 5 | 8 |
| Control (without trans-1,4 polybutadiene) | 97.5 | Soft | Soft | Soft | 94 |
| Dispersion (0.25 parts by weight trans-1,4 polybutadiene per 100 parts of polyisoprene) | 97.5 | 94 | 97.5 | | |

The above table shows that the incorporation of a small amount of trans-1,4 polybutadiene resulted in remarkable improvement in the rate of hardening of the trans-1,4 polyisoprene. The time required for the polymer of isoprene to recover essentially its original hardness was reduced from more than eight minutes to three minutes in the presence of 0.25 part of the polybutadiene.

EXAMPLE II

Further to illustrate the first process of the invention, the hardening rate of a sample of trans-1,4 polyisoprene was increased by blending with a small amount of trans-1,4 polybutadiene. In distinction to Example 1, the trans-1,4 polybutadiene, which was prepared using vanadium-containing catalyst, was added in the form of a blend with a part of the polyisoprene. This enables very small quantities of trans-1,4 polybutadiene to be added.

The trans-1,4 polybutadiene used had an intrinsic viscosity of 1.88 and a softening point of 145° C. It had a trans content in excess of 99 percent, an intrinsic viscosity of 1.88 dl./g. and a crystallinity of approximately 60 percent. The trans-1,4 polybutadiene was totally soluble in toluene.

A solution in benzene of 70 parts by weight of trans-1,4 polyisoprene and 30 parts by weight of trans-1,4 polybutadiene was prepared. The polymers were dissolved in the solvent at 65° C., to give a solution of approximately 8 percent solid level. A blend of the solid polymers was recovered from the solution by coagulation with ethanol and subsequent drying in a vacuum oven. It was observed that this solid blend had good milling characteristics, enabling it to be readily dispersed on a mill with trans-1,4 polyisoprene.

Different quantities of this blend were then dispersed in a sample of trans-1,4 polyisoprene, as described in Example I, and the hardening rate of the resultant product was measured. The results are given in Table II.

TABLE II

| Dispersion | Amount of blend added (parts per 100 trans polyisoprene) | Amount of trans-1,4 polybutadiene added (parts per 100 trans polyisoprene) | Wallace Hardness | | | | |
|---|---|---|---|---|---|---|---|
|  |  |  | Original | Minutes of Cooling | | | |
|  |  |  |  | 2 | 3 | 5 | 8 |
| Control |  |  | 99.0 |  |  |  | 97 |
| 1 | 0.1 | 0.03 | 99.5 |  | 92 | 99.5 |  |
| 2 | 0.25 | 0.075 | 99.5 | 72.5 | 99.5 |  |  |
| 3 | 0.5 | 0.15 | 99.5 | 90.0 | 98.5 | 99.5 |  |

It is seen that amounts of crystalline resine as little as 0.03 part per 100 parts of trans-1,4 polyisoprene are extremely effective in the first process of the invention.

EXAMPLE III

The experiment of Example I was repeated except that a different trans-1,4 polybutadiene was used. The trans-1,4 polybutadiene had a lower crystallinity of 39 percent, a softening point of 85° C. and a trans-1,4 content above 98 percent. The results are shown in Table III.

TABLE III

|  | Wallace Hardness | | | | |
|---|---|---|---|---|---|
|  | Original | Minutes of Cooling | | | |
|  |  | 2 | 3 | 5 | 8 |
| Control (containing no trans-1,4 polybutadiene) | 98 | Soft | Soft | Soft | 94 |
| Dispersion (0.25 parts by weight trans-1,4 polybutadiene per 100 parts of polyisoprene) | 98.5 | 82 | 95 | 98 | 98.5 |

EXAMPLE IV

The trans-1,4 polybutadiene in Example I in the form of a solution in pentane was blended with a pentane solution of trans-1,4 polyisoprene. Two blends were made which contained 0.175 part and 0.25 part, respectively, of trans-1,4 polybutadiene per 100 parts of trans-1,4 polyisoprene. The polymer blends were recovered from mixed solutions by precipitating with ethanol and devolatilizing the precipitate in a vacuum oven and then tested for hardening rate as in the preceding examples. Results are shown in Table IV.

TABLE IV

| Blend | Trans-1,4 polybutadiene (parts per 100 parts of polyisoprene) | Wallace Hardness | | | |
|---|---|---|---|---|---|
|  |  | Original | Minutes of cooling | | |
|  |  |  | 5 | 6 | 8 |
| Control | 0 | 98 | Soft | Soft | 94 |
| 1 | 0.175 | 98 | Soft | 84 | 96 |
| 2 | 0.25 | 98 | 70 | 95 | 97 |

EXAMPLE V

A blend of 0.5 part of an isotactic polypropylene and 100 parts of trans-1,4 polyisoprene as described in Example I was prepared by milling at 160° C. The blend was tested for hardening rate as in preceding examples and found to recover its hardness in five minutes.

EXAMPLE VI

The second process is now illustrated by repeating the experiments of Example I except that the crystalline trans-1,4 polymers of butadiene were replaced by the natural resin "alban."

The crystalline alban resin was extracted from balata by a hot mixture of one volume of methanol and 10 volumes of n-heptane. The extracted resin was precipitated by cooling the slution at 0° C., separating from the liquid phase and then re-crystallizing in heptane. The dispersions were prepared on the mill at 100° C.

The composition and hardening rate of the dispersions are shown in Table VI.

TABLE VI

| Dispersion | Alban resin (parts per 100 parts of trans-1,4 polyisoprene) | Wallace Hardness | | | |
|---|---|---|---|---|---|
| | | Original | Minutes of Cooling | | |
| | | | 3 | 5 | 10 |
| Control | 0 | 98 | Soft | 90 | 98 |
| 1 | 1.0 | 97.5 | 87 | 96 | 97 |
| 2 | 2.5 | 97.5 | 90.5 | 97 | |
| 3 | 5.0 | 97.0 | 95.5 | 97 | |

Data of Table VI indicate that the rate of hardening approximately doubles when one part of alban resin is dispersed in 100 parts of trans-1,4 polyisoprene.

EXAMPLE VII

A series of experiments were carried out using the natural crystalline resin shellac to improve the hardening rate of trans polyisoprene.

The shellac was first washed in ethanol and dried to remove ethanol residue. The resin was then dispersed in the trans-1,4 polyisoprene on the mill at 100° C. The composition and hardening rate of the dispersions are shown in Table VII.

TABLE VII

| Dispersion | Sellac resin (parts per 100 parts of trans-1,4 polyisoprene) | Wallace Hardness | | | |
|---|---|---|---|---|---|
| | | Original | Minutes of Cooling | | |
| | | | 2 | 3 | 5 | 8 |
| Control | 0 | 96 | Soft | Soft | 89 | 94 |
| 1 | 0.1 | 96 | 82 | 92 | 95 | |
| 2 | 0.25 | 96 | 56 | 94 | 95 | |
| 3 | 0.5 | 96 | 65 | 92 | 95 | |

We claim:

1. An improved method of increasing the hardening rate of a trans-1,4 polymer of isoprene which comprises dispersing in 100 parts by weight of said polymer a minor amount of a synthetic crystalline resin, the improvement being in that said resin is at least 35% crystalline and has a softening point of at least 70° C., is used in an amount from about 0.025 to about 0.7 part by weight, and is selected from the group consisting of trans-1,4-polybutadiene and copolymers of butadiene with a minor amount of piperylene.

2. A method as claimed in claim 1 wherein the resin is trans-1,4-polybutadiene having a trans-1,4 content of at least 98 percent.

3. A method as claimed in claim 2 wherein the trans-1,4 polybutadiene is dispersed in an amount of from 0.03 to 0.25 part by weight.

4. A method as claimed in claim 3 wherein the trans-1,4 polybutadiene has a crystallinity of at least 50 percent and an intrinsic viscosity of from 1.0 to 2.5.

5. A method as claimed in claim 4 wherein the trans-1,4 polybutadiene has a softening point of from 110° C. to 150° C.

6. A method as claimed in claim 1 wherein the said crystalline resin is a copolymer of butadiene with up to 15 mole percent of piperylene, said copolymer having a trans-1,4 content of at least 90 percent, a crystallinity of from 35 to 50 percent and a softening point of at least 70° C.

7. A method as claimed in claim 3 wherein the resin is dispersed in the polymer by adding a solution of the resin to a solution of part of the polymer, recovering a solid blend from the mixed solution so formed, mixing said blend in dry solid form with the solid remainder of said polymer.

8. A composition of matter having increased hardening rate which comprises 100 parts by weight of a synthetic trans-1,4 polymer of isoprene and between 0.025 and 0.7 part by weight of a synthetic crystalline resin having a softening point of at least 70° C. and a crystallinity of at least 35% and selected from the group consisting of trans-1,4 polybutadiene and copolymers of butadiene with a minor amount of piperylene.

9. A composition of matter as claimed in claim 8 wherein said resin is a polymer of butadiene having a trans-1,4 content of at least 98 percent, a crystallinity of at least 50 percent, a softening point of from 110° C. to 150° C. and an intrinsic viscosity of from 1.0 to 2.5.

10. In a process of producing a shaped article of a composition containing a synthetic trans-1,4 polymer of isoprene which comprises heating the composition above the softening point of said polymer, shaping to a pre-determined shape and hardening by cooling, the improvement which comprises dispersing in 100 parts by weight of the trans-1,4 polymer from 0.025 to 0.7 part by weight of a synthetic crystalline resin having a softening point of at least 70° C., a crystallinity of at least 35% and selected from the group consisting of trans-1,4 polybutadiene and copolymers of butadiene with a minor amount of piperylene, said improvement resulting in an increased rate of hardening.

References Cited

UNITED STATES PATENTS 3,205,214   9/1965   Talcott _____ 260—894
3,213,160   10/1965  Crouch _____ 260—894

MURRAY TILLMAN, Primary Examiner

M. J. TULLY, Assistant Examiner

U.S. Cl. X.R.

260—5, 27, 94.7, 889; 273—235